(12) United States Patent
Ferguson et al.

(10) Patent No.: US 7,232,041 B2
(45) Date of Patent: Jun. 19, 2007

(54) BATTERY DISPENSER AND REFILL

(75) Inventors: Mark A. Ferguson, Memphis, NY (US); Richard H. Chapman, Camillus, NY (US); Todd B. Abernethy, Skaneateles, NY (US); Jon Gauthier, Bennington, VT (US); John M. Dupnik, Shaftsbury, VT (US)

(73) Assignee: Eveready Battery Company, St. Louis, MO (US)

( * ) Notice: Subject to any disclaimer, the term of this patent is extended or adjusted under 35 U.S.C. 154(b) by 348 days.

(21) Appl. No.: 10/977,224

(22) Filed: Oct. 29, 2004

(65) Prior Publication Data

US 2006/0118572 A1 Jun. 8, 2006

(51) Int. Cl.
*B23Q 7/00* (2006.01)
*B65H 3/00* (2006.01)

(52) U.S. Cl. .................. 221/239; 221/120; 221/241; 221/242; 221/246; 221/255; 221/260; 221/113

(58) Field of Classification Search ............. 221/234, 221/239, 241, 242, 243, 246, 255, 260, 287, 221/113

See application file for complete search history.

(56) References Cited

U.S. PATENT DOCUMENTS

| | | | |
|---|---|---|---|
| 3,437,236 A | 4/1969 | Huck | 221/86 |
| 3,800,940 A | 4/1974 | Thomas | 206/42 |
| 3,869,066 A | 3/1975 | Ferraro | 221/102 |
| 4,209,091 A | 6/1980 | Lieberman | 206/333 |
| 4,369,885 A | 1/1983 | Redmond | 206/484 |
| 4,953,700 A | 9/1990 | DeDino | 206/333 |
| 5,570,810 A | 11/1996 | Lambelet, Jr. et al. | 221/86 |
| 6,039,185 A | 3/2000 | Pedracine et al. | 206/704 |
| 6,488,176 B2 | 12/2002 | Garrant et al. | 221/79 |
| 6,581,799 B1 | 6/2003 | Garrant et al. | |
| 6,631,825 B2 | 10/2003 | Garrant et al. | 221/79 |
| RE38,368 E | 12/2003 | Bishop et al. | 221/197 |
| 6,749,085 B2 | 6/2004 | Garrant et al. | 221/80 |
| 6,769,567 B2 | 8/2004 | Gauthier et al. | 221/79 |

*Primary Examiner*—Gene O. Crawford
*Assistant Examiner*—Timothy Waggoner
(74) *Attorney, Agent, or Firm*—Russell H. Toye, Jr.

(57) ABSTRACT

A battery dispenser and a refill for a battery dispenser are provided. In one embodiment the battery dispenser includes a housing that has an opening, a landing, and a push element capable of advancing batteries from inside the housing to the landing external to the housing. The position of at least one of the push element and the landing is adjustable to enable the battery dispenser to dispense batteries that are one of at least two distinct physical sizes. A refill for the battery dispenser includes a base, a plurality of batteries disposed on the base and a retainer that contacts the batteries and is connected to the base. The refill base can cooperate with the dispenser to adjust the height of the landing or the push element.

54 Claims, 4 Drawing Sheets

BATTERY DISPENSER AND REFILL

BACKGROUND

The present invention relates to a battery dispenser for housing and dispensing batteries. The invention also relates to a refill containing batteries that can be inserted and removed from the battery dispenser.

Button cell batteries, which can be used to operate small devices such as hearing aids, for example, can be difficult to remove from their packaging and to insert into a device in a proper orientation because of their small size. Metal-air button cell batteries, for example, are activated upon contact with oxygen, and therefore have a tab system that covers an air entry port of the metal-air cell prior to use. The tab system functions to limit the transport of water vapor in or out of the cell and limits the ingress of air into the cell sufficient to activate the battery until such time as the cell is placed into service. Therefore when the batteries are removed from the dispenser the tab system is removed and the ports are exposed to the oxygen of the ambient environment, thereby enabling the cell to be activated. The handling of these batteries in removing them from the battery dispenser, removing the tab system, and inserting the batteries into the a device can be difficult, especially in the event a user suffers from reduced dexterity, poor vision or another physical infirmity.

Efforts to address some of these issues are found in the art. U.S. Pat. No. 4,593,700 discloses a packaging that includes a thermoformed or molded blister rotatably attached to a paperboard card. A battery is dispensed from the package by rotating the blister to align a loaded compartment with a trap door accessible in the back of the card. However, the consumer must handle the battery to remove the tab, properly orient the battery with respect to the device terminals and insert it into the device once the battery has been removed from the package.

U.S. Pat. No. 6,039,185 discloses a device for inserting a hearing aid battery into a hearing aid. The tab system is removed as the cell is removed from its packaging; however, the method of separating the cell from its associated tab system places stresses on the hearing aid device and can cause damage to the device.

U.S. Pat. No. 6,581,799 B1, U.S. Pat. No. 6,488,176 B2 and WO02/20371 A1 disclose battery dispensers that enable the user to remove product from a battery dispenser without having to handle the product at any point during the dispensing process or during a process which inserts the battery in an end use device.

None of the above references, however, address the need for a battery dispenser to accommodate batteries of different physical sizes. It is therefore desirable to provide a dispenser that can house and dispense batteries of different physical sizes and to accommodate refills containing batteries of different physical sizes.

SUMMARY

The present invention provides for a battery dispenser for containing and dispensing batteries and a refill for the replacement of batteries in the battery dispenser. In one embodiment the battery dispenser includes a housing having an opening, a landing external to the housing, and a push element that advances a battery disposed inside the housing through the opening to the landing outside the housing. The vertical position of at least one of the push element and the landing is adjustable relative to the housing to a plurality of dispensing positions to enable the battery dispenser to accommodate and dispense batteries of different external dimensions. The battery dispenser can further include a base that supports a plurality of batteries. The base is rotatable with respect to the housing about a common axis. The base can optionally include an adhesive platform to adhere the batteries to the base. For example, the battery can be an air-cell battery having at least one air entry port, and the adhesive platform can include a tab system that covers the air entry port to limit the ingress of air into the cell. The battery dispenser can further include a retainer connected to the base and which contacts the batteries to protect them from being dislodged from the base.

In another embodiment the battery dispenser includes a housing having an opening through which batteries are dispensed, a base, an adjustable landing, and a push element that moves to dispense a battery through the opening. The position of the landing can be adjusted with respect to the housing to a plurality of dispensing heights. In one example embodiment the landing cooperates with the base to adjust the height of the landing when force is applied to the landing by the base.

In another embodiment a refill that can be inserted into the battery dispenser includes a plurality of batteries supported by a base at a plurality of battery positions, and a retainer connected to the base. Each battery is a button cell with a height perpendicular to the diameter, and the base is capable of cooperating with the battery dispenser to adjust the dispenser according to the cell heights. The retainer can define a plurality of openings which coincide with the position of the batteries at a plurality of battery positions along the base. The base can further include an adhesive platform which secures the batteries to the base. The base can include a protrusion, for example, a post, of a predefined length that adjusts the height of the landing of a battery dispenser upon placement of the refill into the battery dispenser. In an example embodiment the post includes a key portion that mates with a key portion of the battery dispenser to orient the refill in a particular position relative to the battery dispenser.

In yet another embodiment of the invention a kit of parts for dispensing batteries includes a refill that includes a plurality of batteries and a battery dispenser adapted to receive the refill. The battery dispenser of the kit includes a housing having an opening, a landing disposed external to the housing and a push element for advancing the batteries through the opening of the housing to the landing. The vertical position of at least one of the landing and the push element of the battery dispenser is adjustable relative to the housing to a plurality of dispensing positions. The refill can include a base, a plurality of batteries disposed on the base, and a retainer connected to the base. The refill can be placed into the battery dispenser to adjust the vertical height of at least one of the push element and the landing to dispense batteries that are of different external physical sizes.

BRIEF DESCRIPTION OF THE DRAWINGS

The example embodiments of the present invention can be understood with reference to the following drawings. The components in the drawings are not necessarily to scale. Also, in the drawings, like reference numerals designate corresponding parts throughout the several views.

DETAILED DESCRIPTION

Figure 1:
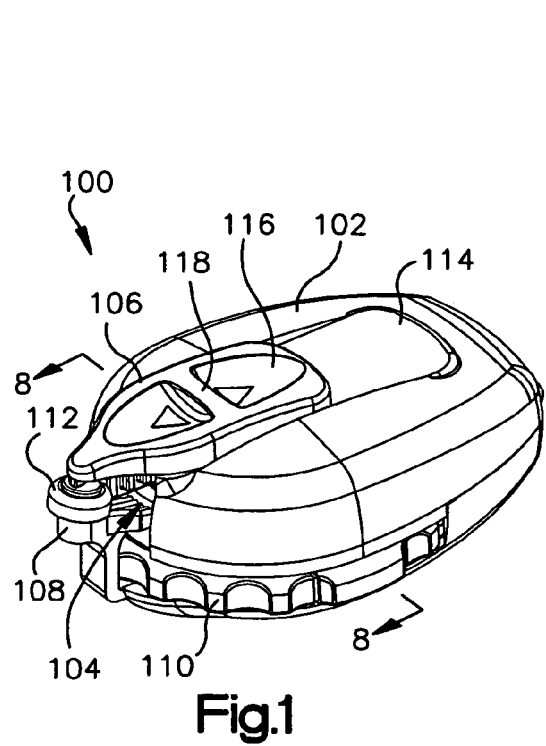
FIG. 1 is a perspective view of a battery dispenser according to an embodiment of the invention.
Figure 2:
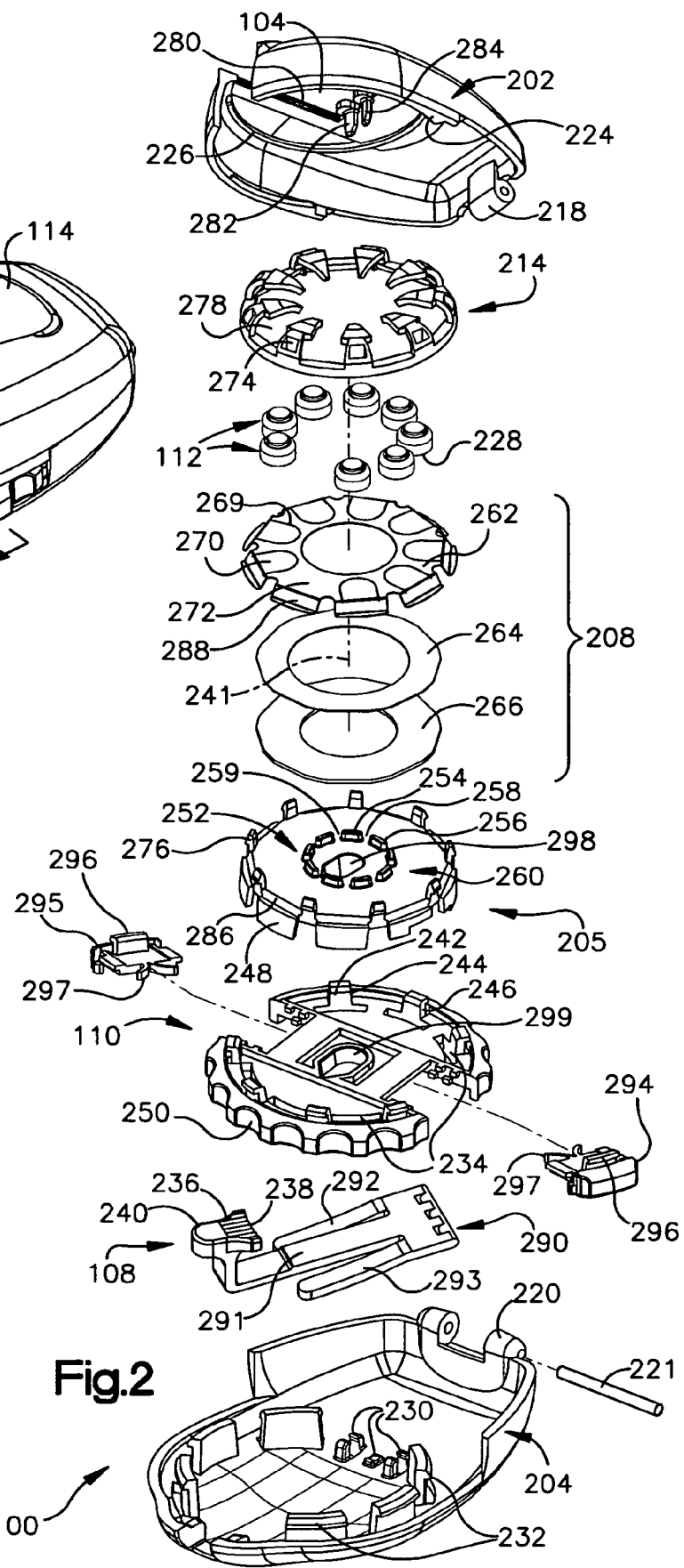
FIG. 2 is an exploded view of the battery dispenser of FIG. 1 according to an embodiment of the invention.

FIG. 1 is a perspective view of a battery dispenser 100 according to an embodiment of the invention. Battery dispenser 100 includes a housing 102 that has an opening 104, a push element 106, a landing 108, and a spinner 110. FIG. 1 shows a battery 112 which has been advanced from inside the housing 102 to the landing 108. An exploded view of the internal and external components of battery dispenser 100, without the push element 106, is illustrated in FIG. 2. Housing 102 (FIG. 1) has a top housing portion 202 and a bottom housing portion 204 which enclose a portion of the landing 108, the spinner 110, a base 205, an adhesive platform 208, a plurality of batteries 112, and a retainer 214.

The top and bottom housing portions 202, 204 can be opened and closed, for example in a clamshell design configuration, and can be held together by one of many alternative connectors, for example, a hinge. The top and bottom housing portions 202, 204 include molded-in hinge portions 218, 220 that are connected together by hinge pin 221. The top housing portion 202 defines the opening 104 along which the push element 106 (FIG. 1) moves in opposing directions between fully retracted, or open, and fully extended, or closed, positions to dispense the batteries 112. A projection 114 on the outer surface of housing 102 (FIG. 1) helps to hold the push element 106 in the open position. A lip 224 that extends inward from portions of the peripheral edge of the top housing portion 202 interacts with the spinner 110 to open and close the housing 102 as will be described in further detail below. The inside surface of the top housing portion 202 can include a flange 226 that contacts the top of the retainer 214, or the top of batteries 112 if retainer 214 is not present, when the top housing portion 202 and bottom housing portion 204 are closed together. The flange 226 can help hold the batteries 112 level against the base 205 and provide a good seal between the bottom surface 228 of the batteries 112 and the base 205. The bottom housing portion 204 has snap connectors 230 for mounting the landing 108, and hook connectors 232 which fit into openings 234 of the spinner 110 to secure the spinner 110 to the bottom housing portion 204.

The landing 108 supports one of the batteries 112 (FIG. 1) that has been moved through opening 104 just prior to installation in an electronic device. The top surface 236 of the landing 108 can have a gradual incline from the proximal end 238 to the distal end 240, to allow a battery 112 to be wedged between the push element 106 and the landing 108. The landing 108 can further include a stop wall (not shown) at the distal end 240 to prevent further forward motion of the battery 112 as it reaches the end of the landing 108. In FIG. 2 the landing 108 connects to bottom housing portion 204, but the landing 108 can be connected, directly or indirectly, to at least one of the housing 102, base 205 and spinner 110.

The base 205 sits on the spinner 110 and rotates together with the spinner 110 relative to the housing 102 about a common axis 241. The spinner 110 is shown as a separate component from the base 205, but in alternative embodiments, the spinner 110 can be integral with the base 205. The upwardly extending hook connectors 242 of spinner 110 have lateral walls, for example walls 244 and 246, which provide a contact surface against the legs 248 of the base 205 to force the base 205 to rotate when the spinner 110 is turned. The spinner 110 is sized to accommodate the base 205 which fits inside the housing 102 (FIG. 1), whereas a portion of the spinner 110 is external to the housing 102 when the housing 102 is closed. This allows the user to rotate the spinner 110 and the base 205 with respect to the opening 104 in the housing 102 in order to dispense the batteries 112. The peripheral surface of the spinner 110 can have dimples 250, or can be otherwise textured to provide a grip as the spinner 110 is turned by the user.

The base 205 includes a turret partition 252 of a plurality of turrets, for example turrets 254 and 256, separated by turret partition openings, for example turret partition openings 258 and 259. The base also includes a deck 260 surrounds the turret partition 252 onto which the plurality of batteries 112 can be mounted. Battery dispenser 100 can dispense batteries 112 of various types and sizes. Batteries 112 can include but are not limited to button cell batteries, for example, metal-air cells. The vertical position of at least one of the landing 108 and the push element 106 is adjustable, and the adjustability can be based on the external physical dimensions of the batteries 112, as will be described in further detail below.

The base 205 can further include an adhesive platform 208 that is the uppermost surface of the deck 260 for securing the batteries 112 to the base 205. The adhesive platform 208 can be a separate component, in which case the adhesive platform can include a tab layer 262 and, optionally, a kill liner 264 and a foam layer 266. In such case, the tab layer 262 of the adhesive platform 208 is the top surface of the base 205 along deck 260 onto which the batteries 112 are mounted. If the batteries are metal-air cells, for example, zinc-air cells, which have at least one air entry port (not shown) on the bottom surface 228 of the batteries 112, the tab layer 262 seals the batteries 112 from an ingress of air in order to prevent premature full activation of the batteries 112. The adhesive platform 208 can be pre-cut, for example with the U-shaped die-cuts 269 in tab layer 262 at a plurality of battery positions 270. The die-cuts allow the tab layer 262 to be peeled away from the bottom surfaces 228 of the batteries 112 while minimizing shear stress between the surfaces of the tab layer 262 and the batteries 112.

The base 205 can be sized so that the deck 260 has a large enough surface area to accommodate the plurality of battery positions 270 and at least one empty position 272. That is, the total of the plurality of battery positions 270 and the at least one empty position 272 is at least one greater than the number of batteries 112 disposed on the base 205. The at least one empty position 272 is reserved for the push element 106 (FIG. 1) when it is in the fully extended or closed position prior to dispensing any of the batteries 112.

The retainer 214 holds down the batteries 112 against the base 205 and prevents the batteries 112 from dislodging due to vibration or dropping during shipping or handling. The retainer 214 can include a number of slot openings 274 to receive snap connectors 276 of the base 205 so that the retainer 214 fits tightly onto the base 205. The latching fit of the snap connectors 276 of base 205 through the slot openings 274 of the retainer 214 can place a compressive force on the shoulders of each of the batteries 112. The compressive force on the batteries 112 helps ensure that they remain in position until dispensed. In addition, compression of the adhesive platform 208 can maintain a better seal between the batteries 112 and the base 205 to effectively limit ingress of air into air entry ports of a metal-air cell to avoid premature full activation. The attachment of the retainer 214 to the base 205 via snap connectors 276 and slot openings 274 described above is one of several possible connections that can be employed between the two components. The retainer 214 can also be connected to the base 205, for example, via heat staking, ultrasonic welding, and other methods known to those of ordinary skill in the art. In an alternative embodiment, the retainer 214 can be integral with the base 205. For example, the retainer 214 can include at least one living hinge (not shown) that can be flexed open to allow insertion of batteries 112 between retainer 214 and base 205 and closed to apply a compressive force on the batteries 112 against the base 205.

The retainer 214 defines a plurality of openings 278 that coincide with the battery positions 270 on the base 205. FIG. 2 shows the retainer 214 having nine openings 278, with the base 205 accommodating up to and including eight batteries 112 at eight battery positions 270, with one empty position 272, which can be occupied by the push element 106 when the battery dispenser 100 is closed. The openings 278 of the retainer 214 allow the push element 106 to move between the fully retracted and fully extended positions to dispense the batteries 112 one at a time. The retainer 214 also functions to prevent rotation of the base 205 relative to the housing 102 unless the push element 106 (FIG. 1) is moved within turret partition 252, for example when push element 106 is in the fully retracted position which will be described in further detail.

Figure 3A:
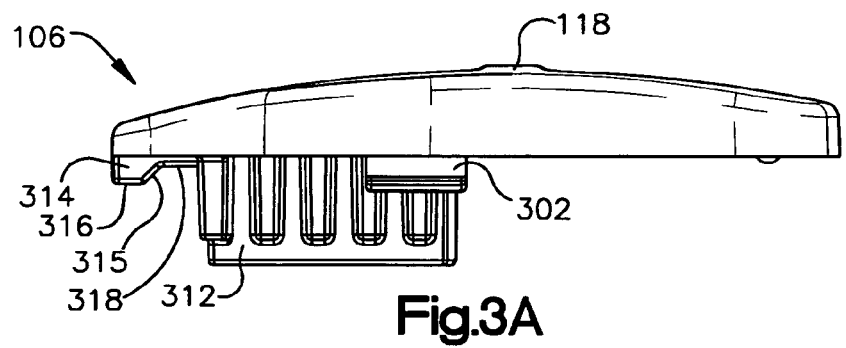
FIG. 3A is an plan side view of a push element of the battery dispenser of FIG. 1 according to an embodiment of the invention.
Figure 3B:
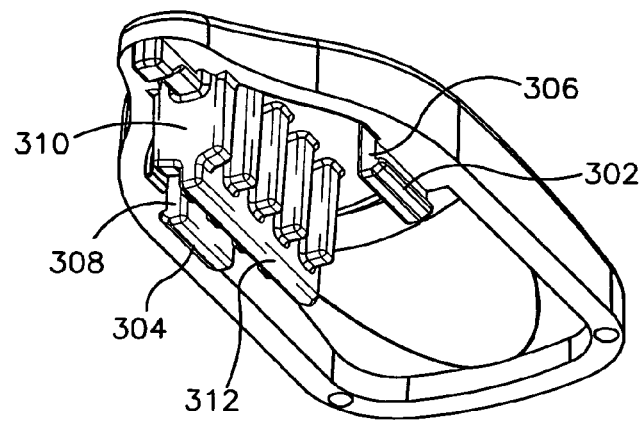
FIG. 3B is a perspective view of the bottom of the push element of FIG. 3A according to an embodiment of the invention.

FIGS. 3A and 3B show a side plan view and a bottom perspective view, respectively, of push element 106 of the battery dispenser 100 of FIG. 1 according to an embodiment of the invention. The push element 106 includes a thumb piece 116 (FIG. 1), which can optionally include gripping rib 118 or a textured surface for gripping the push element 106. At least one slide rail, for example slide rails 302 and 304, maintain a snap connection between the push element 106 and the top housing portion 104 and cooperate with the edge 280 (FIG. 2) along opening 104, which allows the push element 106 to move through the opening 104 between the fully retracted and fully extended positions. The rails 302, 304 define stop walls 306 and 308, respectively, to ensure a stop position for the fully extended push element 106 upon contacting the inside surface of the housing 102.

When the push element 106 is in the fully extended, or closed, position prior to dispensing batteries 112, the push element 106 occupies the empty position 272. When the push element 106 is moved so that it resides within turret partition 252, for example when the push element is in the fully retracted position, the base 205 can rotate with respect to the housing 102 about a common axis 241 to position batteries 112 for dispensing through the opening 104. When one of the batteries 112 is aligned at the opening 104 of the housing 102 the battery is said to be located in the "dispensing position". The detent prongs 282 and 284 (FIG. 2) of the top housing portion 202 interact with the turret partition 252 of the base 205 and create a positive stopping point for each battery position 270 when moved to the dispensing position. At each stop point, the detent prongs 282, 284 occupy a base turret partition opening, for example turret partition openings 258 and 259, to engage turret 254. The edge surfaces of the detent prongs 282, 284 can have radii to limit the holding power within the base turret openings 258, 259 so that the base 205 can continue to rotate to a new position when forced beyond each stop point. As the base 205 rotates the detent prongs 282, 284 slide along the inside surfaces of the turrets 254, 256 and relax at the next pair of turret partition openings 258, 259 to engage the next turret, for example turret 256, and the next battery 112 resides in the dispensing position.

The push element 106 includes a rudder 312 (FIGS. 3A, 3B) that cooperates with the turret partition 252 of the base 205 at each stop position during relative motion between the housing 102 and the base 205. Each stop point aligns a battery position 270 with the opening 104 so that the next battery 112, disposed on the next battery position 270, becomes properly located in the dispensing position. The turret openings, for example turret openings 258 and 259, are sized to permit the rudder 312 of the push element 106 to move through a turret opening 258, 259 when the push element 106 is extended toward the fully extended position. When the push element 106 causes the rudder 312 to occupy a turret opening 258, 259, the base 205 is prevented from rotating with respect to the housing 102. A partial extension of the push element 106 can also prevent rotational motion between the base 205 and the housing 102 if any portion of the rudder 312 occupies a turret opening 258, 259. When the rudder 312 of the push element 106 is located within the turret partition 252 and the rudder 312 does not occupy the aligned turret opening 258, 259, for example when push element 106 is fully retracted, the base 205 and the housing 102 are free to move with respect to each other between stop positions. When the rudder 312 is located outside the turret partition 252 and the rudder does not occupy the aligned turret opening 258, 259, for example when push element 106 is fully extended, the base 205 and the housing 102 would be free to move with respect to each other between the stop positions if it were not for the presence of retainer 214. That is, the rudder 312 interferes with the retainer 214 to prevent unintentional rotation of the base 205 and dislodging of batteries 112 when rudder 312 does not interfere with turret partition 252, for example, when the push element 106 is in the fully extended and fully retracted positions.

Downward extending wall 310 (FIG. 3B) contacts the battery when the push element 106 moves toward the landing 108. The length of the downward extending wall 310 can be sized to make good contact with the battery 112. Optionally, the downward extending wall 310 can be contoured, for example, the extending wall 310 can have a concave face that conforms to a cylindrical battery surface, to aid in smoothly moving an individual battery 112 onto the landing 108. The downward extending wall 310 can have alternative shapes, for example, a V-shape, a U-shape, etc.

To operate battery dispenser 100, the push element 106 which occupies the empty position 272, is moved from the fully extended to the fully retracted position. In this position the rudder 312 is inside the turret partition 252, for example, in the fully retracted position, such that the rudder 312 does not occupy a turret opening 258, 259, so the housing 102 and base 205 can be rotated with respect to each other until a stop point is reached and a battery 112 is located in the dispensing position. The push element 106 is then advanced to the fully extended position, displacing a battery 112 from the base 205 and onto the landing 108.

Figure 4:
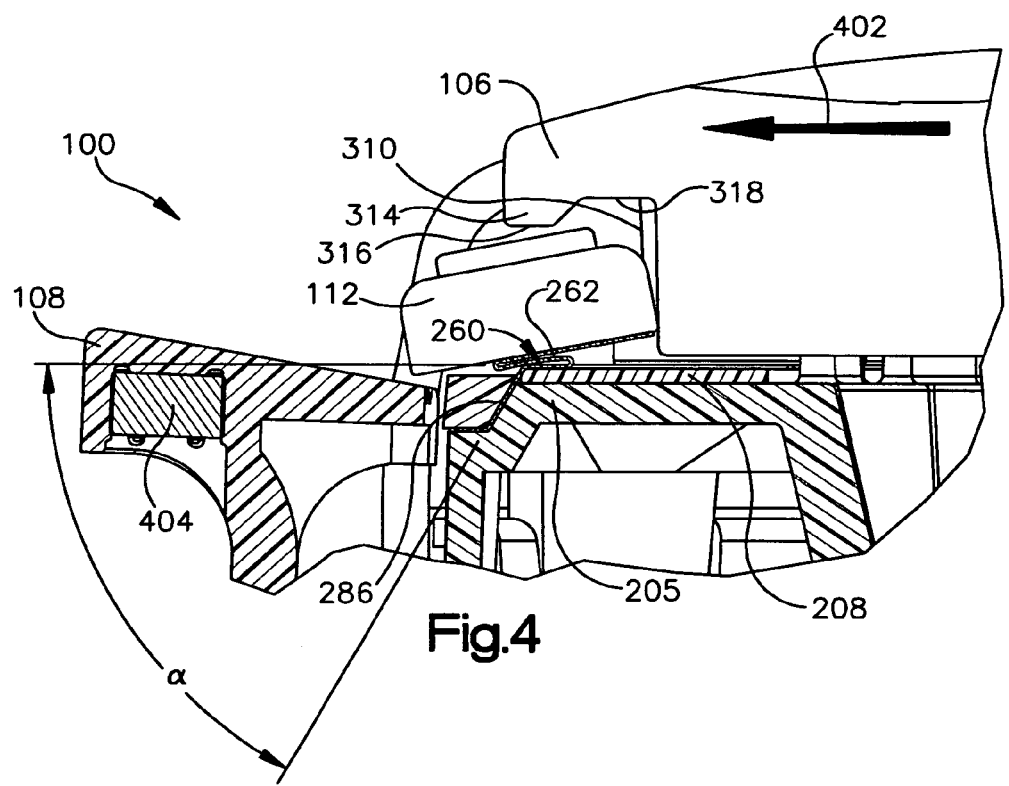
FIG. 4 is a cross-sectional view of a portion of the battery dispenser of FIG. 1 according to an embodiment of the invention.

The nose 314 of the push element 106 includes a bottom surface 315 that is contoured. For example, the bottom surface 315 can extend along at least two horizontal planes. In FIG. 3A the bottom surface 315 is a bi-level surface, where the distance between the base 205 and the bottom surface 315 is greater at the proximal end 318 than at the distal end 316. FIG. 4 is a partial cross-sectional view of battery dispenser 100 of FIG. 1 which shows that as a battery 112 is pushed by the downward extending wall 310 of the push element 106, the contour of the bottom surface of nose 314 allows additional clearance for the battery 112 to tip upwards as the battery 112 releases from tab layer 262 of the adhesive platform 208. This orientation of the battery 112 can facilitate a clean peeling of the battery 112 from the tab layer 262, thereby preventing adhesive residue from adhering to the battery 112 after dispensing. The tipping of battery 112 can also facilitate a smooth peeling action so release of battery 112 from the tab layer 262 does not require a sheer force.

FIG. 4 shows that the upper surface of the peripheral portion 286 of the base 205 and the peripheral portion 288 of the adhesive platform 208, if present, can be angled to facilitate removal of the batteries 112 from the adhesive platform 208. The angle alpha, a, between the plane defined by the peripheral portion 288 of the adhesive platform 208, and the plane defined by the top surface of the base 205 along deck 260, can be greater than zero and as great as nearly 180 degrees, and in some embodiments, the angle alpha, a, can range from about 20 degrees to about 90 degrees, and in other embodiments, the angle, a, can range from about 30 to about 60 degrees. The force on the battery 112 by the extending wall 310 can cause the battery to tip as it reaches the peripheral portion 286 (FIG. 2) of the base 205. As the battery is pushed onto the landing 108, the tab layer 262 folds under the battery in the direction opposite that of the battery displacement, indicated by arrow 402. The cross-section view shows a magnetic component 404 that can aid in controlling and maintaining a battery 112 on the landing 108. The magnetic component 404 can be exposed or embedded within the landing 108.

As described above, battery dispenser 100 (FIG. 2) can accommodate and dispense a plurality of batteries 112 of different sizes. In one embodiment the landing 108 cooperates with the base 205 to adjust the height of the landing 108 depending upon the external dimensions of the batteries 112 and the base 205 within the battery dispenser 100. In one example embodiment, the base 205 applies a force to the landing 108, and the force exerted on the landing 108 causes the landing 108 to adjust so that the height of the base 205 is at least as great as the height of the landing 108. FIG. 2 shows landing 108 has an integral leaf spring 290 with a center beam 291 suspended above ramped side rails 292, 293. The base 205 applies a force to the center beam 291 which forces the landing 108 vertically downward, depending upon the shape of the bottom surface of the base 205. In alternative embodiments the spring 290 can be a separate unit that is connected, directly or indirectly, to the landing 108. Alternative springs can also be used, for example, a torsion spring, a coil spring or a compression spring, as well as a variety of other springs known by those of ordinary skill in the art.

Figure 5:
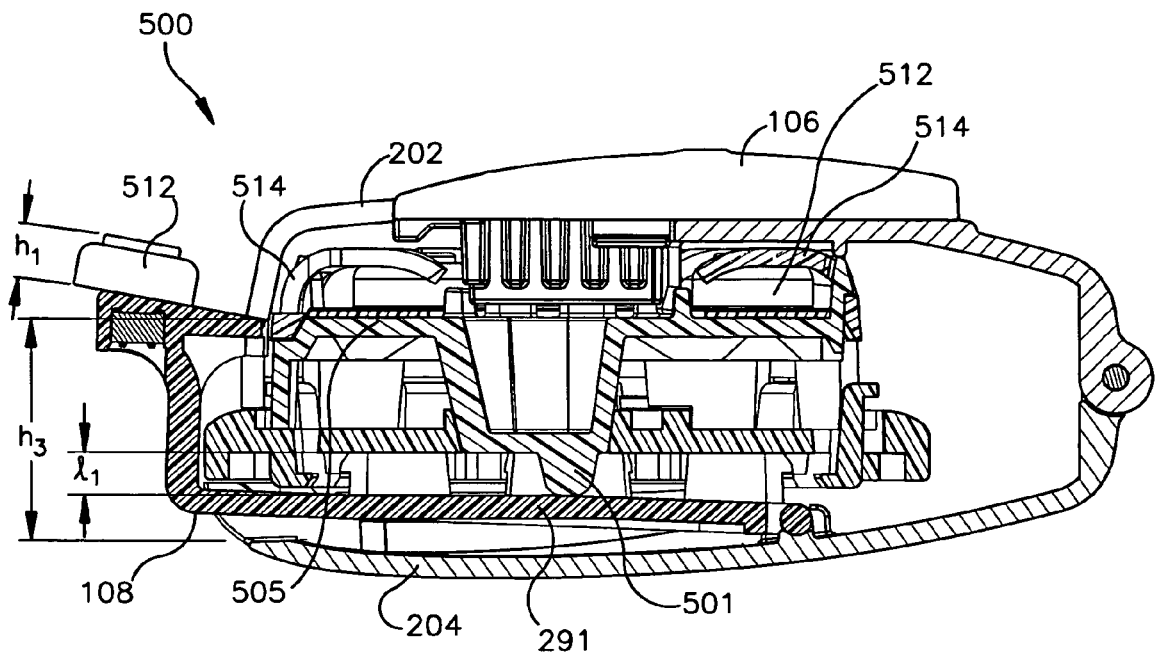
FIG. 5 is a cross-sectional view of a base of a battery dispenser according to an embodiment of the invention.
Figure 6:
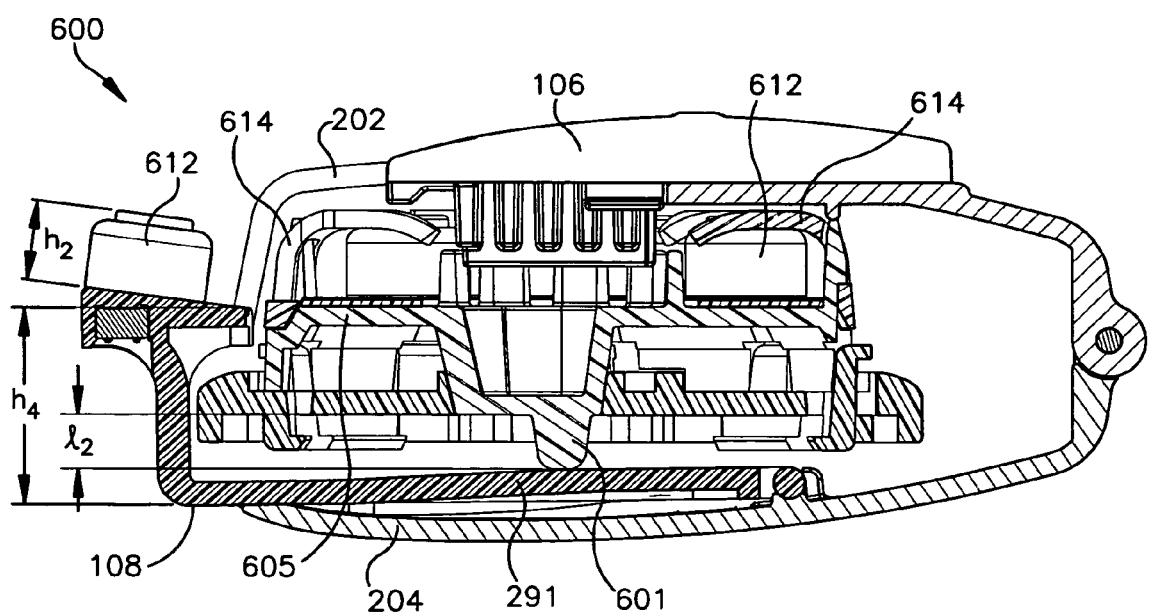
FIG. 6 is a cross-sectional view of a battery dispenser according to an embodiment of the invention.

FIGS. 5 and 6 illustrate battery dispensers 500 and 600 which contain a plurality of small size batteries 512, 612 having heights $h_1$ and $h_2$, respectively, and are supported by two different bases 505, 605. Metal-air button cells are typically supplied in nominal sizes of PR41, PR44, PR48 and PR70. The diameters of these batteries, corresponding to batteries 112 in FIGS. 1, 2 and 4, can vary from about 0.574 centimeters (0.226 inches) to about 1.143 centimeters (0.450 inches), and the heights can vary from about 0.360 centimeters (0.142 inches) to about 0.536 centimeters (0.211 inches). While batteries 512 and 612 have different heights, clearances between the batteries 512, 612 and the top housing portion 202 can be substantially the same to allow the push element 106 to make good contact with the batteries 512, 612 and advance them to the landing 108. Retainer 514 is smaller than retainer 614, and the difference in the heights of the retainers 514, 614 can be about equal to the difference in the height of the batteries 512, 612.

The vertical position, or height, of the landing 108 relative to the bottom housing portion 204 is adjustable based on the size of the batteries 510, 610, supported by the different size bases 505, 605. For example, the proximal end of landing 108 which is positioned at dispensing height $h_3$ to receive batteries 512 supported by base 505 can be adjusted to dispensing height $h_4$ to receive batteries 612 supported by base 605 which has a height $h_4$. The position of the landing 108 can be adjusted such that the height of the proximal end of landing 108 is substantially equal to the height of the bases 505, 605, and alternatively such that the height of the bases 505, 605 are at least as great as the height of the proximal end of the landing 108, to ensure that the landing 108 does not obstruct the path of the battery 512, 612 when it is displaced from the base to the landing 108. The vertical positions, or heights of bases 505, 605 are the respective heights along the top surfaces of bases 505, 605 onto which the batteries are mounted. When the bases 505, 605 include an adhesive platform, the adhesive platform 208 is the top surface of the base 205 onto which the batteries 112 are mounted. The position of the landing 108 can also be adjusted such that a battery 512, 612 advanced to the landing 108 can be contacted and held tightly between the landing 108 and the bottom surface of nose 314 (FIG. 3A). This allows the dispenser 500, 600 to be used as a maneuverable handle to guide the battery 512, 612 into a small electronic device in the proper orientation.

The bases 505, 605 can force the landing 108 vertically downward depending upon the shape of the bottom surfaces of the bases 505, 605. Bottom surfaces of bases 505, 605 include protrusions, for example posts 501, 502 that contact the landing 108. The degree of adjustment of the landing 108 can be controlled by the lengths $1_1$, $1_2$ of the posts 501, 601 of the bases 505, 605, which contact center beam 291 of landing 108. For example, post 601 of base 605, which supports the larger batteries 612, has a length $1_2$ that is longer than the length $1_1$ of post 501 of base 505 and forces center beam 291 of landing 108 downward a greater distance than does post 501 so that the height of the proximal end of the landing 108 at height $h_4$ substantially corresponds with the height of base 605.

Figure 7:
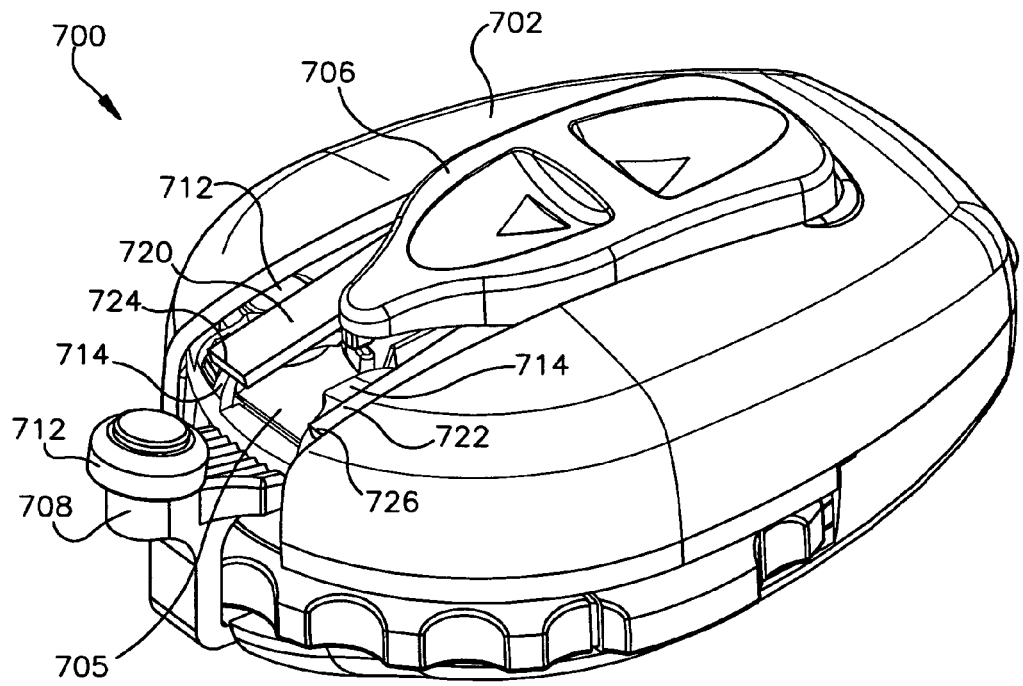
FIG. 7 is a perspective view of a battery dispenser according to an embodiment of the invention.

In another embodiment, shown in FIG. 7, the vertical position of the push element 706 is adjustable based on the external physical dimensions of the batteries housed by the battery dispenser 700. Push element 706 cooperates with an internal component (e.g., battery 712, base 705, or retainer) to adjust the dispensing height of the push element 706 (i.e., the height of the push element during dispensing) according to the height of the batteries 712. Battery dispenser 700 includes at least one guide finger, for example, guide fingers 720 and 722 which are connected, either directly or indirectly, to the top housing portion 702. The push element 706 moves along the guide fingers 720, 722 between a fully retracted and fully extended position to move the batteries 712 from the base 705 to the landing 708. The guide fingers 720, 722 have ends 724, 726, respectively, that can be adjusted vertically to adjust the height of the push element 706 so that it is able to contact and advance batteries of different sizes. The vertical adjustment can be based on the height of the batteries 712, the height of the retainer 714, or both. For example, the ends 724, 726 of guide fingers 720, 722 can rest on the top of the retainer 714, the height of which is based on the height of the batteries 712. The vertical height of the base 705 within the dispenser and the position of the landing 708 can be fixed relative to the housing 702. The height of the base 705 which supports the batteries 712 can be substantially equal to the height of the landing 708, or the height of the base 705 can be at least as great as the height of the landing 708.

Referring to battery dispenser 100 of FIG. 2, after all of the batteries 112 have been dispensed, a new supply of batteries 112 can be loaded into the battery dispenser. The battery dispenser can be reused by removing the base 205 and retainer 214 and placing a refill inside the housing 102. In one embodiment a refill can include a base 205 that supports a plurality of batteries 112, and a retainer 214 that connects to the base 205. The base 205 can also include an adhesive platform 208 that secures the batteries 112 to the base 205. The batteries can be metal-air cells, for example, zinc-air cells. The adhesive platform can be precut, for example, tab layer 262 can have a plurality of U-shaped die cuts 269 at the plurality of battery positions 270. The base 205 and adhesive platform 208 can include a deck portion 260 and a peripheral edge portion 280, where the peripheral edge portion 280 is angled relative to the deck portion 260 as described above. The base 205 of the refill can include a post (not shown in FIG. 2) having a predefined length that depends upon the physical dimensions of the batteries 112 disposed on the base 205. The base 205 can include a key portion 298, for example on the post, that mates with a key portion of a battery dispenser, for example key portion 299 on the spinner 110, when the refill is inserted into the battery dispenser 100. The refill can contain batteries 112 of the same size or a different size than those originally contained in the battery dispenser 100, and the refill can contain the same number or a different number of batteries 112 than originally contained in the battery dispenser 100. At least one of the landing 108 and push element 106 of battery dispenser 100 is adjustable according to the size of the batteries 112 in the refill.

Figure 8:
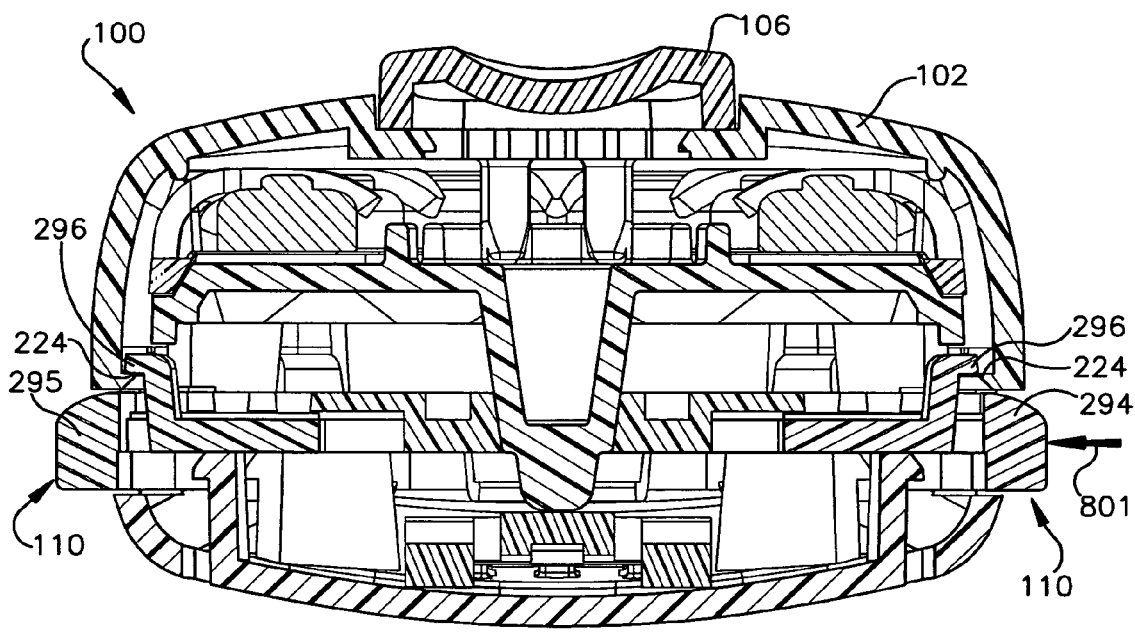
FIG. 8 is a cross-sectional view of the inside of the battery dispenser of FIG. 1 taken along lines 8—8 according to an embodiment of the invention.

Access to the inside of the battery dispenser 100 can be achieved by depressing release buttons, for example, buttons 294 and 295, of spinner 110, although in alternative embodiments, release buttons could be located elsewhere on the battery dispenser to open the housing. Buttons 294, 295 have outwardly extending hook connectors 296 that engage the lip 224 of the top housing portion 204 to maintain the housing 102 in a closed position. FIG. 8 is a cross-sectional view of battery dispenser 100 of FIG. 1. The hook connectors 296 can move inward toward the center of the battery dispenser 100, as depicted by arrow 801, when the buttons 294, 295 are depressed. This causes the hook connectors 296 to disengage from the lip 224 of the top housing portion 204. The buttons 294, 295 can be spring actuated so that a spring bias forces the hook connectors to return to their original positions when the buttons 294, 295 are released. An exploded view of buttons 294, 295 (FIG. 2) reveals integral leaf springs 297 that allow the buttons 294, 295 to depress so the housing 102 can be opened and cause the buttons 294, 295 to return to their original positions when released. The buttons 294, 295 can be spring actuated by one or more of alternative springs, such as a torsion spring, a coil spring or a compression spring. The spring 297 (FIG. 2) can be a separate unit that is connected, directly or indirectly, to the buttons 294, 295, or the spring 297 can be integral with buttons 294, 295

When the empty position 272 is aligned with opening 104 and landing 108, the base 205 is said to be in the "load position". When the base 205 is in the load position the push element 106 can occupy the empty position 272, before the battery dispenser 100 is used and also when a refill is placed into the battery dispenser 100. The base 205 can have a first key portion 298 and the spinner 110 can have a second key portion 299 that mate when the base 205 is in the load position. The shapes of the key portions 298, 299 can be such that the first and second key portions mate when the base 205 is only one position, for example, when the empty position 272 is aligned with the landing 108. For example, FIG. 2 shows that both the first and second key portions 298, 299 have an apex that ensures only one possible orientation of the base 205 relative to the spinner 110. That orientation is when the empty position 272 of the base 205 is aligned with the opening 104 and the landing 108, i.e. the load position.

Opening the housing 102 can also be accomplished when the base 205 and the spinner 110, once mated, are in only one position relative to the housing 102 and the landing 108. For example, in FIG. 2 the housing 102 can be opened only when both buttons 294, 295 are depressed, and both buttons 294, 295 can be depressed only when the base 205 is in the load position, i.e. the empty position 272 is aligned with the landing 108 and opening 104. This will ensure that the base 205 is oriented relative to the housing 102 so that there will be no batteries 112 aligned with the opening 104 when the housing 102 is opened. Such an orientation can prevent a battery 112 from becoming dislodged from the base 205 and fully activated upon opening the housing 102. The buttons 294, 295 are accessible to the user only when the base 205 is in the load position and the empty position 272 is adjacent to the landing 108 and the opening 104. When the spinner 110 is rotated to align a battery position 270 with the opening 104, at least one of the buttons 294, 295 becomes at least partially hidden inside the housing 102 and at least one of the hook connectors 242 of the spinner 110 is engaged with the lip 224 of the housing 102, so the housing 102 cannot be opened.

The components of the battery dispenser and refill in the example embodiments described above can be made of any suitable durable material, for example, thermoplastic materials including but not limited to polycarbonate, acrylonitrile butadiene styrene (ABS), nylon, polyethylene, polypropylene, and polystyrene. The top housing portion 204 can be a transparent or translucent material, for example, polycarbonate or acrylic, which allows the user to readily see the contents of the battery dispenser. A suitable polycarbonate material is LEXAN® 143R resin manufactured by G.E. Plastics and available from Polymer Land Service Center, Pittsburgh, Pa, USA. The push element 106 can be molded from a polystyrene material such as STYRON® 6075, manufactured by Dow Plastics and available from General Polymers, Columbus, Ohio, USA.

As described above with respect to FIG. 2, the deck 260 of the base 205 can further include an adhesive platform 208. In one embodiment the adhesive platform 208 includes a tab system comprising a tab layer 262 having at least one layer of a polymer film that can control the diffusion of oxygen and vapor through air entry ports of the batteries 112 and a removable adhesive layer disposed on the polymer film between the batteries 112 and the polymer layer. A suitable tab system is a two-layer laminate that includes a polyolefin based material with a removable acrylic adhesive available as PRIMAX® 350 with R143 adhesive from Avery Dennison of Painesville, Ohio, USA. The tab layer can be adhered to the base 205 by a permanent adhesive. A suitable permanent acrylic adhesive is S8760 from Avery Dennison.

In another embodiment the adhesive platform 208 can further include a foam layer 266 between the base 205 and the tab layer 262. Foam layer 266 can be a laminate having permanent adhesive on both sides and can be adhered directly to the base 205. A kill liner layer 264 can also be applied to selective portions of the foam layer 266, for example between the permanent adhesive of the foam layer 266 and the tab layer 262, to selectively block the adhesive surface of the foam layer 266 from contacting selected portions of the tab layer 262. Blocking selective portions of the tab layer 262 from the permanent adhesive on the foam layer 266 can reduce the force needed to remove a battery 112 from the adhesive platform 208. A suitable double-sided closed cell foam layer laminate with permanent adhesive on both sides is available as a single product, product number 4105, available from Label Technologies, Inc. of Suwanee, Ga., USA. A suitable kill liner layer is a polyolefin based material, under the trademark MYLAR®, with R-143 adhesive available as a single product, No. 72907, from Label Technologies, Inc. If a kill liner is not used, the foam layer laminate may have permanent acrylic on one side and the other side may be pattern printed with a permanent adhesive to minimize the amount of permanent adhesive that contacts the tab layer.

In any of the embodiments described above, the adhesive platform 208 can optionally include an overcoat layer (not shown). Cutouts are provided in the overcoat layer to expose limited portions of the top adhesive layer. The cutouts can generally be larger than the diameter of the cells so that the cells do not come in direct contact with the overcoat layer. A suitable overcoat layer is available from Label Technologies, Inc., product number 2216 (interfilm metalized polyester). Other materials with an aesthetically appealing appearance on the surface that will avoid the accumulation of dust and debris can be used in place of polyester overcoat layer.

In an alternative embodiment each battery can have an individual discrete tab system adhered to each battery. Each battery and tab system can be mechanically or adhesively joined to the base. For example, a permanent adhesive may be selectively printed onto the base in discrete locations to coincide with the number and spacing of batteries. The tab system can be mechanically separated from the air cell when advanced from the interior of the housing to the landing while the tab system remains attached to the base.

In another embodiment the push element is not a moveable component of the dispenser. For example, it can be fixed to part of the housing, such as the top or bottom portion of the housing, such that when the base is rotated to advance a battery toward the dispensing position, contact between the advancing battery and the push element causes the movement of the battery to change direction such that the battery is pushed through the opening and onto the landing as rotation continues.

In the embodiments of the invention described above, the batteries on a single base in the dispenser and refill are all the same size. However, in alternative embodiments batteries of more than one size can be disposed on a single base. In such embodiments at least one of the landing and the push element is adjustable based on the heights of individual batteries in the dispensing position.

In the embodiments of the invention described above, the spinner and base can be rotated more than one full revolution about the common axis and can be rotated either clockwise or counterclockwise. In addition, a battery in the dispensing position does not necessarily have to be dispensed before rotating the spinner to position another battery in the dispensing position. This allows the user to select any of the batteries in the dispenser for dispensing. This feature is particularly useful when batteries of different sizes or types are disposed on a single base. However, the dispenser and refill can be configured such that the spinner can be rotated in only one direction and so that batteries must be dispensed in sequence according to their positions on the base.

A kit for dispensing batteries can include a battery dispenser containing a plurality of batteries described in example embodiments above, and a refill according the example embodiments described above. In one embodiment the battery dispenser includes a housing having an opening, a base that supports a plurality of batteries, a landing and a push element that moves to displace the batteries from the base to the landing, and the position of at least one of the landing and the push element relative to the housing is adjustable. The refill can include a base, a plurality of batteries disposed on the base, and a retainer connected to the base. The battery dispenser kit can also include a battery dispenser that does not contain batteries or a base which supports the batteries. For example, the battery dispenser kit can include a battery dispenser that includes a housing having an opening, a push element that is capable of advancing batteries, a landing, a spinner, and also, a refill that includes a base, a retainer, and a plurality of batteries disposed on the base. The battery dispenser and the refill contained in the kit can be in accordance with the example embodiments of the battery dispenser and refill described above.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A battery dispenser for dispensing batteries, the battery dispenser comprising:
    a housing comprising an opening;
    a landing disposed external to the housing; and
    a push element for advancing batteries through the opening of the housing to the landing;
    wherein the vertical position of at least one of the landing and the push element is adjustable relative to the housing to a plurality of dispensing positions.

2. The battery dispenser of claim 1, wherein a force exerted on the landing changes the vertical height of the landing.

3. The battery dispenser of claim 2, wherein the battery dispenser further includes a spring in physical communication the landing, and the force, when exerted on the spring, changes the vertical height of the landing.

4. The battery dispenser of claim 1, wherein:
    the battery dispenser further comprises at least one guide finger in physical communication with the housing, the height of the guide finger within the housing being adjustable; and the push element is moveable along the guide finger.

5. The battery dispenser of claim 4, wherein the guide finger has an end, and the height of the end is adjustable based on the external dimensions of the batteries.

6. The battery dispenser of claim 1, wherein the battery dispenser further comprises a base, and the vertical position of at least one of the push element and the landing is adjustable relative to the position of the base.

7. The battery dispenser of claim 6, wherein the base comprises a deck for supporting the batteries, the height of the deck being at least as great as the height of a proximal end of the landing.

8. The battery dispenser of claim 7, wherein the height of a proximal end of the landing is the same as the height of the deck.

9. The battery dispenser of claim 6, wherein the base cooperates with the landing to adjust the height of the landing.

10. The battery dispenser of claim 9, wherein the base comprises a protrusion and the protrusion contacts the landing to adjust the position of the landing.

11. The battery dispenser of claim 6, wherein the battery dispenser further comprises a spring that exerts a force against the landing when contacted by the base.

12. The battery dispenser of claim 11, wherein the spring is integral with landing.

13. The battery dispenser of claim 6, further comprising: a retainer connected to the base; and
wherein the housing cooperates with the retainer to adjust the height of the push element.

14. The battery dispenser of claim 13, wherein the battery dispenser further comprises at least one guide finger attached to the housing, the at least one guide finger having an end that contacts the retainer, and the push element is moveable along the at least one guide finger between a fully retracted and a fully extended position to advance the batteries through the opening of the housing.

15. The battery dispenser of claim 14, wherein the housing comprises a top portion and a bottom portion which cooperate with each other to establish an open position and a closed position.

16. The battery dispenser of claim 6, wherein the base and the housing are rotatable with respect to one another about a common axis.

17. The battery dispenser of claim 16, wherein the push element is moveable between a fully refracted and a fully extended position, and the base and housing are rotatable with respect to one another only when the push element is in the fully refracted position.

18. The battery dispenser of claim 6, wherein the base comprises a deck portion and a peripheral edge portion, the peripheral edge portion being angled relative to the deck portion of the base.

19. The battery dispenser of claim 6, wherein the base comprises an adhesive platform.

20. The battery dispenser of claim 19, wherein a portion of the adhesive platform is precut.

21. The battery dispenser of claim 6, wherein the battery dispenser further comprises a spinner in physical communication with the base, and the spinner and the base are rotatable with respect to the housing about a common axis.

22. The battery dispenser of claim 21, wherein the base comprises a first portion of a key, and the spinner comprises a second portion of a key that can mate with the first portion of the key.

23. The battery dispenser of claim 22, wherein the key of the base can mate with the key of the spinner when the base is oriented in only one position relative to the spinner.

24. The battery dispenser of claim 21, wherein the spinner comprises at least one button that can be depressed to open the housing.

25. The battery dispenser of claim 1 wherein the push element comprises a nose having a contoured bottom surface that extends along at least two planes.

26. The battery dispenser of claim 6 wherein the battery dispenser further comprises a plurality of batteries secured to the base.

27. The battery dispenser of claim 26 wherein the battery dispenser further comprises a retainer in physical communication with the base, the retainer contacting the batteries.

28. The battery dispenser of claim 27, wherein the batteries are zinc metal-air cells.

29. A battery dispenser for dispensing batteries, the battery dispenser comprising:
a housing comprising an opening through which batteries are dispensed;
a base;
a landing; and
a push element that moves to dispense batteries through the opening;
wherein the position of the landing is adjustable relative to the housing to a plurality of dispensing heights.

30. The battery dispenser of claim 29, wherein the height of the landing is adjustable relative to the height of the base.

31. The battery dispenser of claim 29, wherein the base comprises a deck portion for mounting the batteries, and the height of the deck portion is at least as great as the height of a proximal end of the landing.

32. The battery dispenser of claim 31, wherein the height of the proximal end of the landing is the same as the height of the deck.

33. The battery dispenser of claim 29, wherein the battery dispenser further comprises a spring and a force exerted on the spring changes the vertical height of the landing.

34. The battery dispenser of claim 29, wherein the landing cooperates with the base to adjust the height of the landing.

35. The battery dispenser of claim 34, wherein the landing comprises a spring that is contacted by the base to adjust the height of the landing.

36. The battery dispenser of claim 34, wherein:
the dispenser further comprises a battery having a top surface and a bottom surface;
the push element comprises a nose having a bottom surface, and the bottom surface has a downward projection therefrom; and
when the battery is advanced by the push element onto the landing, the bottom surface of the battery is in contact with the landing and the top surface of the battery is in contact with the protrusion.

37. The battery dispenser of claim 29, wherein the housing comprises a top portion and a bottom portion which cooperate with each other to establish an open position and a closed position.

38. The battery dispenser of claim 37, wherein the top portion and the bottom portion of the housing are connected by a hinge.

39. The battery dispenser of claim 29, wherein the base and the housing are rotatable with respect to one another about a common axis.

40. The battery dispenser of claim 29, wherein the push element is moveable between a fully retracted and fully extended position, and the base and housing are rotatable with respect to one another only when the push element is in the fully retracted position.

41. The battery dispenser of claim 29, wherein the base comprises a deck portion and a peripheral edge portion, the peripheral edge portion being angled relative to the deck portion.

42. The battery dispenser of claim 29, wherein the base comprises an adhesive platform.

43. The battery dispenser of claim 42, wherein a portion of the adhesive platform is precut.

44. The battery dispenser of claim 29, wherein the battery dispenser further comprises a spinner in physical communication with the base, and the spinner and the base are rotatable with respect to the housing about a common axis.

45. The battery dispenser of claim 44, wherein the base comprises a first portion of a key, and the spinner comprises a second portion of a key that can mate with the first portion of the key.

46. The battery dispenser of claim 45, wherein the key of the base can mate with the key of the spinner when the base is oriented in only one position relative to the spinner.

47. The battery dispenser of claim 46, wherein the spinner comprises at least one button that can be activated to open the housing.

48. The battery dispenser of claim 29, wherein the push element comprises a nose having a contoured bottom surface that extends along at least two planes.

49. The battery dispenser of claim 29, wherein the battery dispenser further comprises:
a plurality of batteries; and
a retainer in physical communication with the base for securing the plurality of batteries to the base.

50. The battery dispenser of claim 29, wherein:
the landing cooperates with the base to adjust the height of the landing;
the base comprises a deck portion for mounting the batteries; and
the height of the deck portion is at least as great as the adjusted height of a proximal end of the landing.

51. The battery dispenser of claim 50, wherein the base comprises a peripheral edge portion, and the peripheral edge portion is angled relative to the deck portion of the base.

52. The battery dispenser of claim 51, wherein the base comprises an adhesive platform that comprises a tab layer.

53. The battery dispenser of claim 52, wherein the base comprises a first portion of a key, and the spinner comprises a second portion of a key that can mate with the first portion of the key.

54. The battery dispenser of claim 53, wherein the battery dispenser further comprises a plurality of metal-air cell batteries.

* * * * *